Patented Dec. 29, 1953

2,664,165

UNITED STATES PATENT OFFICE 2,664,165

INCREASING PRODUCTIVITY OF SILICEOUS GEOLOGICAL FORMATIONS

Donald C. Bond, Crystal Lake, Ill., assignor to The Pure Oil Company, Chicago, Ill., a corporation of Ohio No Drawing. Application August 17, 1951, Serial No. 242,420

11 Claims. (Cl. 166—21)

This invention relates to a method for rendering earth bores more permeable to flow of fluids through the walls thereof and more particularly for increasing the productivity of oil and gas wells and to decrease the pressure required to force liquid or gas into injection wells during pressuring or flooding operations by increasing the permeability of siliceous subterranean geological formations.

In the development of oil fields subsequent to the drilling of the bore hole and prior to the production of oil in commercial rates, there are a number of operations carried out which are necessary for completing the well. These well completion methods include such operations as excluding sand and water from the bore hole, scraping the bore hole walls to remove the sheath of clay deposited when a clay-laden drilling mud is employed as well as various procedures for securing the maximum ultimate production of gas or oil from the producing formation.

It is an object of this invention to provide a method for increasing the production of gas and oil wells by means of a combination treating method which essentially consists in hydraulically fracturing the producing formation and sequentially introducing sufficient amounts of a chemical reagent into the fractured formation to dissolve the reagent soluble constituents of the formation.

It is a further object of this invention to provide also a means for rejuvenating producing formations which no longer yield commercial quantities of oil.

It is another object of the invention to facilitate the ease with which fluid such as water, brine or natural gas can be forced into a well bore.

In increasing the productivity of an oil and gas producing formation various methods have been employed. During the early days of oil field development work shooting or torpedoing of oil wells was employed to increase production. This method consisted of placing a large charge of nitroglycerine or other explosive adjacent to the producing formation. This charge was exploded which resulted in a breaking down of the formation sand or creating cracks or fissures in the formation. This expedient for increasing the production efficiency of a geological formation of necessity was a hazardous operation involving occupational dangers to the personnel and special precautions which had to be taken in placing the shot so that when the explosion occurred there would be no damage to the casing and other well equipment or an inadvertent rupturing of the various strata overlying the producing formation which would result in top water being admitted to the well or oil and gas escaping to these overlying formations. From this pioneer method was evolved the acid treatment method and the disadvantages attendant upon well shooting were obviated to some extent by utilizing the acid treatment of wells. In applying the acid treatment to a well it was necessary for the acid to be forced radially from the bore hole under pressure into the interstitial passageways within the producing formation. The acid when contacted with the exposed formation surfaces would dissolve the soluble constituents of the formation thereby increasing the permeability of the producing formation surrounding the well. This method of well completion has been used quite extensively in treating limestone or dolomite reservoir rocks for these particular formations are quite susceptible to the solventizing properties of hydrochloric acid. There is however a large amount of oil which is produced from siliceous formations which are composed essentially of silica. This formation constituent is substantially involnerable to the action of hydrochloric acid. While it is well known that silica is soluble in aqueous solution of hydrogen fluoride, the high reactivity of hydrogen fluoride when in contact with human skin tissue and the formation of insoluble silicic acid with resulting plugging makes the handling of this chemical reagent quite hazardous and undependable. The process of the present invention obviates these drawbacks. Briefly described, this process consists in pumping a high viscosity fluid into the producing zone which is being treated. By forcing this high viscosity material which is in the form of a colloidal gel at a given rate of flow there is produced within the formation a pressure sufficient to fracture the producing formation and increase the permeability and open drainage channels therein. The gel is then removed from the fractured sections by contacting it with a peptizing agent or so-called gel breaker which causes the gel to revert to a less viscous sol. The low viscosity of the sol permits it to be flushed readily from the well. This method of hydraulic fracturing, which is also known under the registered trade mark "Hydrafrac," has been combined with the acidizing process described above to treat limestone wells. However the combination of these two methods for increasing production has not heretofore been successfully employed in the treating of siliceous formations. It has been found that there are several inorganic chemical reagents which may be handled with a minimum of danger to the operator but will effectively dissolve a siliceous formation without the attendant deposition of clogging precipitates within the formation interstices. These reagents when used separately in combination with the above described hydraulic fracturing treatment produce results that will yield far greater increases in production then when a hydraulic fracturing or chemical treating of the siliceous formation alone is employed.

In accordance with this invention it has been found that if a fluophosphoric acid solution is employed in conjunction with the hydraulic fracturing of siliceous formations there is effectuated a substantial increase in the permeability of the siliceous formation. In carrying out the invention a high viscosity fluid is introduced into the formation in the form of a colloidal solution of a petroleum hydrocarbon oil and an oil soluble aluminum soap. The hydrocarbon oils that may be employed include gasoline, kerosene, diesel oil, crude oil, or a mixture of these fluids.

The aluminum soap employed may be derived from a combination of relatively high molecular weight organic acids. A suitable soap must be capable of being combined with a petroleum oil to form a highly viscous gel which may be readily reverted to a low viscosity colloidal sol when contacted with peptizing or gel-breaking agent. It has been found that a very soluble aluminum soap is prepared by the application of the well-known process of precipitation from excess alkali using a mixture of coconut oil acid, naphthenic acid, and oleic acid. This soap forms a solid which will dissolve and gel rapidly in gasoline and kerosene. Other soaps with suitable gelling characteristics, such as aluminum stearate, may also be employed.

It is preferred however to employ an aluminum soap compounded from several organic acids. One essential element of the combination is aluminum laurate or a saturated fatty acid soap containing a major proportion of this compound. To provide superior gel-forming properties an aluminum naphthenate and aluminum oleate soap mixture is added as a second ingredient. While these gels are illustrative it is not intended that the instant invention be limited in its application to the use of the foregoing gels. Any aluminum soap which will function as a gelling agent for a hydrocarbon oil to form a high viscous, readily pumpable gel which may be peptized with facility may be utilized. The gel employed is pumped into the producing zone under a given rate of flow thereby producing a pressure within the producing zone in excess of that due to the overburden pressure. This excess pressure produces a fracturing of the formation. An aqueous solution of fluophosphoric acid is pumped into the well immediately following the introduction of the hydraulic fracturing gel. By means of this treatment it is thereby seen that the introduction of the hydrocarbon gel into the formation produces fractures whereby the aqueous solution of fluophosphoric acid may be introduced into the formation and contact the exposed surfaces to dissolve them.

After the chemical reagent used has remained in contact with the exposed formation surfaces for a time sufficient to react therewith and enlarge the formation passages, the reaction effluent and unreacted reagent are flushed from the formation. The gel which had been forced into the formation is reverted to a low viscosity solution by contacting it with a peptizing agent or so-called gel breaker. These gels are susceptible to the peptizing action of water and many other substances. For example, when the combination of aluminum laurate-aluminum naphthenate-oleate soap is used as the gelling agent, water, acetic acid, or triethanol amine may be used as a gel breaker. As an alternative to this subsequent step of peptizing the fracturing agent, a slow acting peptizer may be incorporated into the gel just prior to pumping the gel into the formation. As a result of this manipulation, the gel peptizes in situ so that the formation being treated may be flushed of not only the reaction effluent and unreacted chemical reagent but also the peptized gel with greater efficiency. Examples of such slow acting peptizers are $n$-butyl amine and di $n$-butyl amine. This peptizer will cause the gel to revert to a sol within about 24 hours. It is well known that the increase in production that is obtained by simply increasing the permeability of the producing formation adjacent the bore hole is limited. By employing this combination of hydraulic fracturing of the formation the formation solvent may permeate the formation to greater distances than is permitted when acidizing alone is used.

While the aforementioned soaps are preferred as gelling agents for the hydrocarbon-containing gel type fracturing fluid it is also intended that other pumpable, highly viscous hydrocarbon gels may be used. For example, gelled hydrocarbons prepared by using gelling agents such as divinylacetylene, smoked sheet, crepe, or latex rubber are also capable of being employed in this invention. In the event that gelled hydrocarbons thus prepared are utilized as formation fracturing agents, gel breakers or peptizers in the form of plasticizers, coupling agents, or mutual solvents could be used.

Further illustrating this invention the following typical sequential operations are employed in subjecting a producing formation or injection well to a combination hydraulic fracturing and acidizing process. For maximum effectiveness the formation to be treated should be isolated from the other adjacent formations to prevent fracturing and acidizing at undesired levels. This is effected by setting casing within the bore hole and perforating the selected interval or by means of expansible packers which expand against the wall of the bore hole thus providing a seal. By means of a string of tubing which extends within the casing from the earth's surface to the isolated formation undergoing treatment the highly viscous hydrocarbon gel is pumped into the formation. A typical gel comprises about 10 to 20 parts of hydrocarbon liquid to 1 part gelling agent. However depending upon the viscosity desired and constituents used gels containing as low as 4 to 6% of gelling agent may be used to prepare a viscous gel. The peptizer or gel breaker for this formulation if slow acting may be admixed with the gel during its preparation, otherwise the gel breaker is employed separately in a subsequent gel peptizing step. The gel is injected into the formation until a pressure in excess of the overburden pressure is produced. Generally, a bottom hole pressure is required which is greater, in pounds per square inch, than the depth in feet. Again, depending upon formation conditions (strength of the rock), this pressure will vary. Pumping equipment generally utilized in cementing wells may be effectively employed for forcing the gel into the formation. After a sufficient pressure has been built up to fracture the formation the chemical reagent is forced into the fracture passages in the formation. By chemical reaction with the silica components of the formation, the interstices are enlarged and the permeability increased. Conventional acidizing equipment and technique may be used for this chemical treatment. After permitting the chemical reagents to remain in contact for a time sufficient to react with the formation, the formation is flushed free of the chemical treating agents and the low viscosity sol which results from peptizing the hydrocarbon gel and the well may be put on production. In some instances it is desirable to incorporate into the gel a hard graded sand of uniform spherical granular configuration such as a 20-40 mesh silica sand. This sand is retained within the fractured crevices after the gel has been flushed therefrom and functions as a propping agent to retain the formation in a fractured condition. However some difficulty may be encountered where sand is so used, because of the effect on screens and pumps. Through this use of sand a temporary propping condition obtains inasmuch as the subsequent introduction of the chemical reagent, capable of reacting with the siliceous components of the formation, will react with the siliceous propping agents resulting in their substantial disintegration. However even functioning in a temporary capacity, the siliceous propping agents serve a useful purpose in retaining the formation in a fractured condition and thus facilitate the deeper penetration of the chemical reagent into the fractured formation.

To show the efficacy of the chemical reagents employed by this invention in combination with the hydraulic fracturing treatment in increasing the production of siliceous formations the following tests were carried out:

Cylindrical cores consisting of Berea sandstone were placed in an apparatus and separately contacted with aqueous solutions of fluophosphoric acid or caustic alkali. This sandstone which consists essentially of $SiO_2$ is especially representative of geological sandstone formations encountered in well drilling operations. After sandstone cores had been treated the permeability of these cores was determined by noting the time required to pass a fluid through the treated core. Table I summarizes the results obtained in determining the effect of fluophosphoric acid on Berea sandstone.

TABLE I

*Effect of HF and associated acids on Berea sandstone cores*

| No. | Acid Solution Used | Total Hydrogen Fluoride in Acid Solution Equivalents/Liter or Moles HF/ Liter of Solution | Permeability | | Final Permeability/ Initial Permeability |
| --- | --- | --- | --- | --- | --- |
| | | | Initial Millidarcys | Final Millidarcys | |
| 1 | 10% HF | 5.2 | 13.8 | 29.0 | 2.1 |
| 2 | 20% HF | 10.7 | 34.1 | 194 | 5.7 |
| 3 | 30% HF | 16.5 | 21.5 | 239 | 11.1 |
| 4 | 40% HF | 22.6 | 16.8 | ∞ | ∞ |
| 5 | 15% HCl | | 4.7 | 3.3 | 0.7 |
| 6 | 12% HCl+20% $NH_4F$ | | 17.0 | 6.8 | 0.4 |
| 7 | 16% HCl+16% $NH_4F$ | | 5.3 | 0.0 | 0.0 |
| 8 | 34% $H_2SO_4$+26% $NH_4F$ | | 14.2 | 0.0 | 0.0 |
| 9 | 28% HF+18% $NH_4F$ | | 17.8 | 0.0 | 0.0 |
| 10 | 20% $NH_4F$ | | 10.4 | 6.2 | 0.6 |
| 11 | 12% HCl+19% KF | | 9.0 | 2.7 | 0.3 |
| 12 | 3.5% HCl+3.9% NaF | | 26.7 | 1.9 | 0.07 |
| 13 | 17.7% $H_3PO_4$+14.4% $NH_4F$ | | 34.0 | 13.6 | 0.4 |
| 14 | 42.7% $HBF_4$+2.7% $H_3BO_3$ | | 34.0 | 51.6 | 1.52 |
| 15 | 50% Mono FP* Acid | 6.9 | 58 | 152 | 2.62 |
| 16 | 25% Mono FP Acid | 2.9 | 61 | 68 | 1.11 |
| 17 | 12.5% Mono FP Acid | 1.5 | 66 | 28 | 0.24 |
| 18 | 50% Di FP Acid | 13.4 | 80 | ∞ | ∞ |
| 19 | 25% Di FP Acid | 5.8 | 72 | 178 | 2.48 |
| 20 | 12.5% Di FP Acid | 2.7 | 120 | 39 | 0.33 |
| 21 | 50% FP Acid #3** | 26.9 | 156 | ∞ | ∞ |
| 22 | 25% FP Acid #3 | 11.2 | 109 | 235 | 2.15 |
| 23 | 12.5% FP Acid #3 | 5.6 | 61 | 91 | 1.49 |

*FP is used in the foregoing table to mean fluophosphoric acid.
** Concentrated aqueous solution of hexafluophosphoric acid, comprising approximately 65% $HPF_6$.

In the series of tests shown in Table I it is seen that when aqueous solutions of a fluophosphoric acid equivalent to at least about 5% hydrogen fluoride solution are employed for treating a siliceous material very effective results are shown. The advantage to be obtained by the use of this material is that fluophosphoric acid does not have the handling problems that are evident when employing hydrogen fluoride for the treating of siliceous formations. The fluophosphoric acids may be safely handled in their anhydrous form without the fear of producing acid burns which hydrogen fluoride will effect in any form. Moreover the formation of undesirable silicic acid does not ordinarily occur.

In carrying out this invention large quantities of both the hydrocarbon gel and acid are usually needed. Volumes from 20 to 50 barrels gelled medium may be used although larger volume treatments may be necessary. When employing a fluophosphoric acid it is preferred that an acid concentration equivalent to at least about 20% hydrofluoric acid is employed although lower concentrations may be employed. Therefore in order to effectively treat a formation about 1,000 to 17,000 pounds or more of acid should be used. This acid must be employed in the form of an aqueous solution. The acid and the water can be either premixed and injected as a solution or the acid and water may be separately injected into the well consecutively or simultaneously. Preferably the anhydrous acid is mixed with water in the well, to avoid handling of the aqueous mixture, since the mixture can cause serious burns. The chemical reagent is maintained in contact with the formation for a time sufficient to react therewith thereby increasing the size of the formation interstices with a resultant increase in formation permeability. Depending upon the size of the formation if the acid is kept in contact therewith for a period of from about 6 to 24 hours an effective increase in formation permeability is obtained although longer periods may be required. For a further exposition of chemical treating techniques that may be employed in conjunction with this invention reference is made to the following related application: Serial No. 323,603, filed December 2, 1952.

It is to be understood that the instant invention is not limited to the sequential process outlined above. That is, the chemical treatment of the formation may be carried out while the hydraulic fracturing fluid is still in the formation or it may be effectuated after the fracturing fluid has been flushed from the formation. Each of these alternative steps has its own advantages in that if the former method is employed the chemical reagent will assist in peptizing the gel type fracturing fluid while if the latter method is employed the fractured crevices vacated by the gel will provide additional formation exposures which will be susceptible to the action of the chemical reagent employed in this invention.

It is therefore seen that by means of this invention there has been found a method for effectively increasing the permeability of a siliceous formation by means of a combination which consists of initially hydraulically fracturing the sandstone formation and immediately thereafter forcing into the fractures created by this treatment a medium which is not only capable of dissolving the sandstone formation but which also may be safely handled without the physiological disadvantages which are attendant when employing the treating agents described in the prior art for treating siliceous formations to increase their permeability. By means of this combination treatment the ultimate yield of gas and oil from a producing siliceous formation is increased beyond that which would be obtained if the treating steps employed in the combination method described by this invention were employed. Although this invention has been primarily directed to a means for well completion it is to be understood that it may be also employed in rejuvenating siliceous producing formations which still have available a means of primary drive. It may be also employed in secondary recovery operations wherein it is necessary to open up so-called tight formations in order that the flushing fluid employed in the recovery operation may be readily introduced into the formation to force out the oil remaining therein.

What is claimed is:

1. A method for increasing the permeability of a siliceous subterranean geological formation traversed by a bore hole the steps which comprise hydraulically fracturing said formation by forcing thereinto a highly viscous colloidal gel to produce within said formation a pressure in excess of the static formation overburden pressure and sufficient to fracture said formation, forcing into said fractured formation a fluophosphoric acid solution in an amount sufficient to react with said formation, peptizing said colloidal gel to produce a low viscosity sol, and flushing said sol, unreacted acid, and effluent reaction products from said formation.

2. A method in accordance with claim 1 in which the fluophosphoric acid is monofluophosphoric acid.

3. A method in accordance with claim 1 in which the fluophosphoric acid is difluophosphoric acid.

4. A method in accordance with claim 1 in which the fluophosphoric acid is hexafluophosphoric acid.

5. A method in accordance with claim 1 in which the fluophosphoric acid is a mixture of fluophosphoric acids selected from the group consisting of monofluophosphoric, difluophosphoric and hexafluophosphoric acids.

6. In a method for increasing the permeability of a siliceous subterranean geological formation traversed by a bore hole the steps which comprise hydraulically fracturing said formation by forcing a highly viscous colloidal gel into said formation to produce within the said formation a pressure in excess of the static formation overburden pressure and sufficient to fracture said formation, forcing into said fractured formation an aqueous solution of a fluophosphoric acid yielding upon hydrolysis theoretically at least the equivalent of a 5% aqueous solution of hydrogen fluoride in an amount sufficient to react with said formation, peptizing said colloidal gel to produce a low viscosity sol, and flushing said sol, unreacted acid and the effluent acid reaction products from said formation.

7. In a method for increasing the permeability of a siliceous subterranean geological formation traversed by a bore hole the steps which comprise hydraulically fracturing said formation by forcing thereinto a highly viscous colloidal gel to produce within the said formation a pressure in excess of the static formation overburden pressure and sufficient to fracture said formation, forcing into said fractured formation an aqueous solution of a fluophosphoric acid consisting of substantially equal parts of fluophosphoric acid and water in an amount sufficient to react with said formation, peptizing said colloidal gel to produce a low viscosity sol, and flushing said sol, unreacted acid and the effluent acid reaction products from said formation.

8. A method in accordance with claim 7 in which the siliceous formation treated is substantially free from formation water.

9. In a method for increasing the permeability of an oil-bearing siliceous formation the steps which comprise hydraulically fracturing said formation by forcing thereinto a highly viscous aluminum soap petroleum hydrocarbon colloidal gel to produce within said formation a pressure in excess of the static formation overburden pressure and sufficient to fracture said formation, forcing into said fractured formation an aqueous solution of a fluophosphoric acid yielding upon hydrolysis theoretically at least a 5% by weight aqueous solution of hydrogen fluoride in an amount sufficient to react with said formation, peptizing said colloidal gel to produce a low viscosity sol, and flushing said sol, unreacted acid and effluent acid reaction products from said formation.

10. In a method for increasing the productivity of a siliceous, oil-bearing formation the steps which comprise hydraulically fracturing said formation by forcing threinto a highly viscous aluminum soap petroleum hydrocarbon colloidal gel to produce within said formation a pressure in excess of the static overburden pressure and sufficient to fracture said formation, forcing into said fractured formation an aqueous solution of a fluophosphoric acid consisting of substantially equal parts of fluophosphoric acid and water in an amount sufficient to react with said formation, peptizing said colloidal gel to produce a low viscosity sol, and flushing said sol and the effluent acid reaction products from said formation.

11. A method in accordance with claim 10 in which the fluophosphoric acid employed is difluophosphoric acid.

DONALD C. BOND.

References Cited in the file of this patent

UNITED STATES PATENTS

| Number | Name | Date |
|---|---|---|
| 1,990,969 | Wilson | Feb. 12, 1935 |
| 2,386,605 | Harton et al. | Oct. 9, 1945 |

OTHER REFERENCES

"The Hydrafac Process," World Oil, February 1, 1951.